(No Model.)
C. F. HURREL.
PIPE COUPLING.
No. 404,413. Patented June 4, 1889.
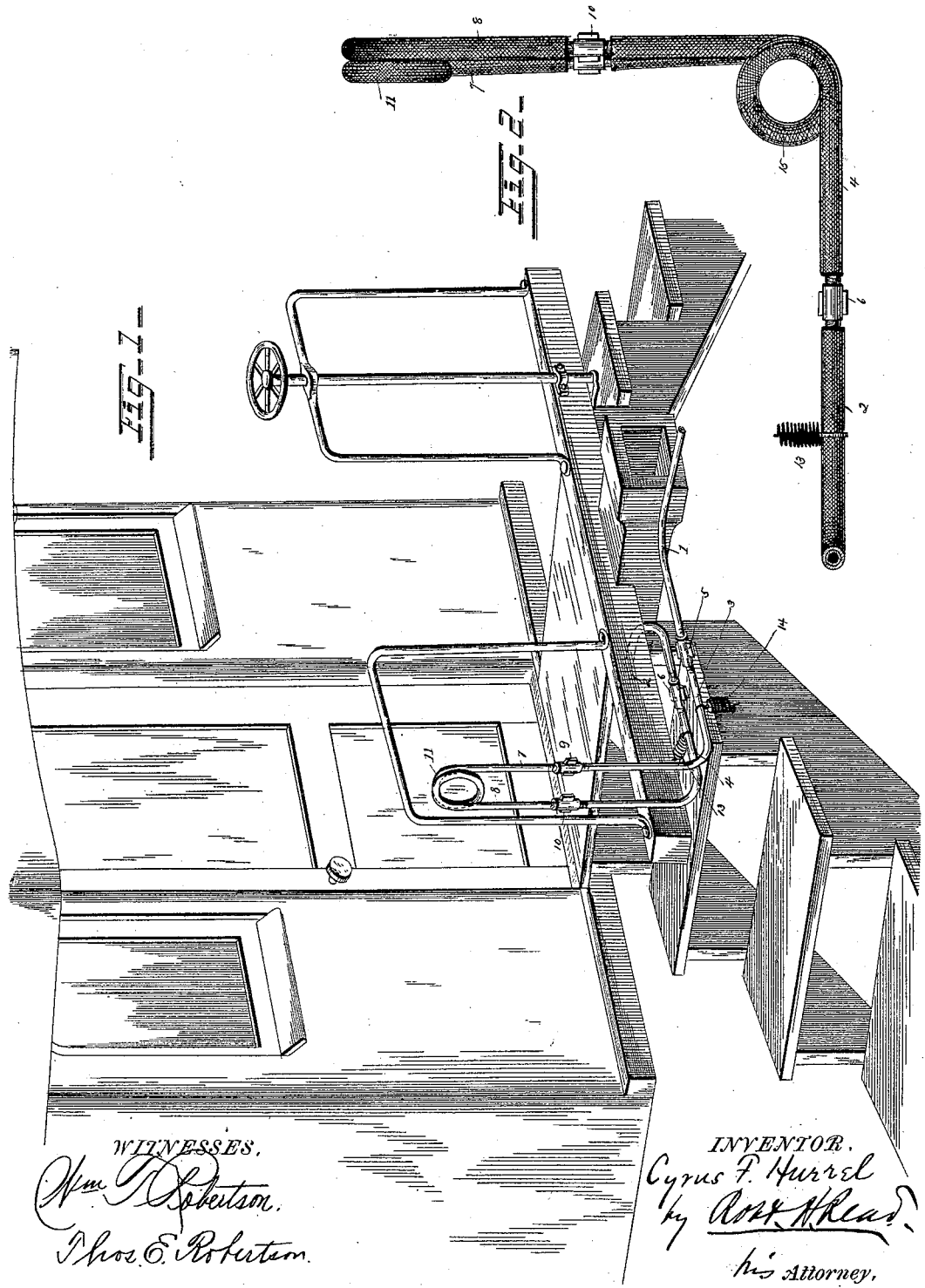
WITNESSES.
Wm T. Robertson.
Thos. E. Robertson.
INVENTOR.
Cyrus F. Hurrel
by Robt. H. Read
his Attorney.

UNITED STATES PATENT OFFICE.

CYRUS FRAILEY HURREL, OF HOLTON, KANSAS.

PIPE-COUPLING.

SPECIFICATION forming part of Letters Patent No. 404,413, dated June 4, 1889.

Application filed September 3, 1888. Serial No. 284,462. (No model.)

*To all whom it may concern:*

Be it known that I, CYRUS FRAILEY HURREL, a citizen of the United States, residing at Holton, in the county of Jackson and State of Kansas, have invented certain new and useful Improvements in Pipe-Couplings for Railway-Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a pipe-coupling for railway-cars, and has especial reference to a simple and efficient connection between passenger-cars of the pipes leading to the steam-heating apparatus used in said cars.

The object of the invention is to provide a coupling which will be simple in structure, will be durable, and will withstand the action of steam and exposure to climatic changes.

Various efforts have heretofore been made to provide an efficient connection of the character referred to. The necessary prerequisites to a safe connection are that the coupling shall yield sufficiently to permit the longitudinal variations in distance between the cars when the latter are at their extremes of movement, as when starting or slowing up, to have a connection which can be readily coupled or uncoupled when a train is being made up, to make the coupling in such a way that there will be a minimum tendency to clog the pipes by the freezing of condensed steam in cold weather, and that the coupling shall be able to withstand the exposure to all kinds of climatic variations and be unaffected by the circulation of steam. It has heretofore been proposed to make such a coupling by joining the pipes with pivotal connections, so as to give the necessary play. It has also been proposed to have telescopic connections, which will permit the necessary movement. In some cases flexible pipes made of vulcanized rubber or other suitable fabric have been used. The objection to the couplings provided with pivotal connections is that they are expensive to manufacture. They wear at the joints, and unless carefully attended to and provided with packing will in a short time permit the steam to escape. The difficulty with the flexible couplings is that they soon deteriorate under the influence of the heat and pressure and climatic changes to which they are subjected. In a coupling made in accordance with my invention the necessary play of the cars is permitted, while the objections had to the several types above mentioned are obviated.

My invention embodies a bent pipe provided with two limbs adapted to be coupled to the heating-pipes of the car and so shaped as to permit the necessary expansion and contraction of the limbs as the cars approach or separate in transit. The coupling is preferably provided with two or more turns or coils bent so as to increase its expansibility.

In the accompanying drawings, which illustrate my invention, Figure 1 is a view in perspective showing the end of a car having my coupling attached thereto. Fig. 2 is a side view of a modified form of the coupling and part of a heating-pipe to which it is attached.

1 and 2 represent the terminal pipes of the two cars, which are connected to the heating apparatus in the usual way, which latter is not here shown. To these terminal pipes are connected by suitable connecting-pieces 5 and 6 the horizontal limbs 3 4 of my coupling. These limbs extend horizontally for a short distance and then curve upwardly, terminating in one or more coils 11 at the point where they meet. This coil 11 is preferably made so as to lie, when in proper position, in a plane parallel to the length of the train. The limbs are preferably made sectional, so that the parts 7 8 11 can be removed when desired, the connecting-pieces 9 and 10 rendering this result attainable. A coil-spring 13, attached to the car, is connected to the pipe, as shown, so as to render the strain uniform on the horizontal and vertical limbs of the coupling and to partially relieve torsional strain when the train is rounding a curve. The pipes are covered with textile material, as shown in Fig. 2, so as to mitigate low temperatures in winter and reduce the condensation of steam. Where the end-play between the cars is unusually great, a coil or coils may also be made in the limbs of the coupling, as shown at 15, Fig. 2, the coils lying within the angle, as shown, to prevent too much steam settling in the bend and giving trouble from freezing. The connecting-pieces 5 6 9 10 are preferably provided with a nipple or nipples, as shown in the drawings, so that a wrench can be readily applied and a connection or disconnection of the coupling made. In the manufacture of the coupling the metal is tempered or hardened at the points where the bends are located, so as to increase the elasticity at the points where it is most needed.

While the form shown in the drawings is the most efficient and enables the coupling to be reduced to such a compass that it would be entirely out of the way, it is still practicable to use a coupling with simply two vertical limbs and a single bend at the top. Such a form, however, would necessarily require such a length of its limbs as to make it an obstruction in using the car; but I desire to have it understood that my invention is not limited to the specific forms I have shown, but will cover any form of coupling provided with two limbs capable of the necessary expansion.

I am aware that a pipe-coupling has been heretofore proposed in which the pipes are arranged in zigzag relation under the cars, so as to permit the necessary expansion. Such a structure necessarily requires so much room for its use that it must be put under the car, where it is difficult of access for adjustment or disconnection.

Having thus described my invention, what I claim, and desire to secure by Letters Patent, is—

1. A coupling for the steam-pipes of railway-cars, comprising a bent metallic pipe having two limbs and provided with one or more coils at the bend, the curvature of the coils being in the same plane with the arms and parallel with the direction of strain, and a connecting device for attaching it to the steam-pipes of abutting cars.

2. A coupling for the steam-pipes of railway-cars, comprising a bent metallic pipe having parallel limbs, both limbs being bent at an intermediate point and provided with one or more coils or turns at each bend to permit a ready yielding in the direction of strain, and a connecting device for attaching the coupling to the steam-pipes of abutting cars.

3. The combination of the pipes 1 and 2, attached to the cars, the coupling connected thereto, said coupling being provided with parallel arms adapted to yield in the direction of strain, a coil connecting the arms, said coils being in the same plane with the arm and parallel with the direction of strain, and springs 13 14, as and for the purpose set forth.

In testimony whereof I affix my signature in presence of two witnesses.

CYRUS FRAILEY HURREL.

Witnesses:
J. P. BRADLEY,
M. Z. JONES.